(12) United States Patent
Broyde et al.

(10) Patent No.: US 8,222,919 B2
(45) Date of Patent: Jul. 17, 2012

(54) MULTICHANNEL INTERFACING DEVICE HAVING A TERMINATION CIRCUIT

(75) Inventors: Frederic Broyde, Maule (FR); Evelyne Clavelier, Maule (FR)

(73) Assignee: Excem, Maule (FR)

(*) Notice: Subject to any disclaimer, the term of this patent is extended or adjusted under 35 U.S.C. 154(b) by 60 days.

(21) Appl. No.: 12/964,115

(22) Filed: Dec. 9, 2010

(65) Prior Publication Data

US 2011/0095838 A1    Apr. 28, 2011

Related U.S. Application Data

(63) Continuation of application No. PCT/IB2009/051182, filed on Mar. 20, 2009.

(30) Foreign Application Priority Data

Jul. 8, 2008   (FR) ...................................... 08 03876

(51) Int. Cl.
  *H03K 17/16*   (2006.01)
(52) U.S. Cl. ................................ 326/30; 326/21; 326/86
(58) Field of Classification Search .............. 326/21–34, 326/82–87
See application file for complete search history.

(56) References Cited

U.S. PATENT DOCUMENTS

| | | | |
|---|---|---|---|
| 6,226,330 B1 | 5/2001 | Mansur | |
| 7,362,130 B2 * | 4/2008 | Broyde et al. | 326/30 |
| 7,408,426 B2 * | 8/2008 | Broyde et al. | 333/100 |
| 7,477,068 B2 * | 1/2009 | Truong et al. | 326/27 |
| 7,477,069 B2 * | 1/2009 | Broyde et al. | 326/30 |
| 7,764,083 B2 * | 7/2010 | Broyde et al. | 326/30 |
| 7,870,322 B2 * | 1/2011 | Liaw et al. | 710/305 |
| 7,884,648 B2 * | 2/2011 | Broyde et al. | 326/86 |
| 7,932,741 B2 * | 4/2011 | Broyde et al. | 326/30 |
| 7,952,380 B2 * | 5/2011 | Broyde et al. | 326/21 |
| 8,049,576 B2 * | 11/2011 | Broyde et al. | 333/125 |
| 8,081,704 B2 * | 12/2011 | Ginis et al. | 375/285 |
| 8,125,240 B2 * | 2/2012 | Broyde et al. | 326/21 |
| 2011/0019760 A1 * | 1/2011 | Nguyen | 375/267 |

FOREIGN PATENT DOCUMENTS

FR            2 849 728           7/2004

OTHER PUBLICATIONS

Broyde, "Clear as a Bell Controlling Crosstalk in Uniform Interconnections," IEEE Circuits & Devices Magazine, (Dec. 2004), pp. 29-37.

Broyde et al., "A New Pseudo-Differential Transmission Scheme for On-Chip and On-Board Interconnections", Proceedings of the CEM 08 International Symposium on Electromagnetic Capatibility, (May 2008).

International Search Report for International Application No. PCT/IB2009/051182, dated Jul. 6, 2009.

* cited by examiner

*Primary Examiner* — Vibol Tan
(74) *Attorney, Agent, or Firm* — Barnes & Thornburg LLP

(57) ABSTRACT

The invention relates to an interfacing device for transmission through interconnections used for sending a plurality of electrical signals.

The interfacing device of the invention comprises signal terminals and a common terminal. A receiving circuit delivers, when the receiving circuit is in the activated state, "output signals of the receiving circuit" determined each by a linear combination of the voltages between one of the signal terminals and the common terminal, to the destination. A termination circuit is such that, when it is in the activated state, it is approximately equivalent, for the signal terminals and the common terminal, to a (m+1)-terminal network such that, for small signals, the impedance matrix, with respect to the common terminal, of the (m+1)-terminal network is equal to a wanted non-diagonal matrix of size m×m.

11 Claims, 8 Drawing Sheets

MULTICHANNEL INTERFACING DEVICE HAVING A TERMINATION CIRCUIT

CROSS REFERENCE TO RELATED APPLICATIONS

This is a Continuation Application of PCT application PCT/IB2009/051182, filed 20 Mar. 2009, published in English under No. WO 2010/004444, which in turn claims priority to French patent application number 08/03876 of 8 Jul. 2008, entitled "Dispositif d'interface multicanal avec circuit de terminaison", both of which are incorporated herein by reference.

FIELD OF THE INVENTION

The invention relates to an interfacing device for transmission through interconnections used for sending a plurality of electrical signals, such as the interconnections made with multiconductor cables, or with the traces of a printed circuit board, or inside an integrated circuit.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:

the binary signals used in binary signaling, that is to say any signal such that, in each transmission channel, the set of the values that this signal may take on has 2 elements;

the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits. Multilevel signals, for instance quaternary signals (sometimes referred to as PAM-4 or 4-PAM), are used to obtain high bit rates. We will consider that any signal which does not comply with this definition of a digital signal is an analog signal. Thus, the result of any type of modulation of a carrier by a digital signal will be regarded as an analog signal.

Said transmission may be obtained through an interconnection comprising m+1 conductors, among which m transmission conductors. A device for transmission in such an interconnection is shown in FIG. 1, this device comprising an interconnection (1) having m=4 transmission conductors (11) (12) (13) (14) and a reference conductor (7), that is to say a ground conductor. In FIG. 1, each end of the interconnection is connected to a termination circuit (4). The transmitting circuit (5) receives at its input the signals of the 4 channels of the source (2), and its 5 output terminals are connected to the conductors of the interconnection (1), one of these conductors being ground. The receiving circuit (6) has its 5 input terminals connected to the conductors of the interconnection (1), one of these conductors being ground. The device shown in FIG. 1 provides 4 transmission channels, such that the signals of the 4 channels of the source (2) are sent to the 4 channels of the destination (3). The device shown in FIG. 1 is somewhat general. For instance, according to the case, one and/or the other termination could comprise no component. For instance, according to the case, the transmitting circuit (5) and/or the receiving circuit (6) could comprise no component. However, devices differing from the one shown in FIG. 1 are also conceivable, for instance devices for transmission comprising several sources and/or several destinations, based on a data bus architecture.

The simplest transmission method for obtaining m transmission channels uses m single-ended links. Using m single-ended links, each transmission channel uses one transmission conductor of the interconnection, and the reference conductor (ground) is used for the return current produced by the currents flowing on the m transmission conductors. This scheme may be implemented according to FIG. 1. This method is subject to two detrimental phenomena: echo and crosstalk between the different transmission channels.

The prior art concerning transmission without echo and without crosstalk, applicable to this patent application, is set out in the 3 following patents:

the French patent number 0300064 of 6 Jan. 2003 entitled "Procédé et dispositif pour la transmission avec une faible diaphonie", corresponding to the international application number PCT/EP2003/015036 of 24 Dec. 2003 (WO 2004/062129), entitled "Method and device for transmission with reduced crosstalk";

the French patent number 0302814 of 6 Mar. 2003 entitled "Procédé et dispositif numériques pour la transmission avec une faible diaphonie", corresponding to the international application number PCT/EP2004/002382 of 18 Feb. 2004 (WO 2004/079941), entitled "Digital method and device for transmission with reduced crosstalk";

the French patent number 0303087 of 13 Mar. 2003 entitled "Procédé et dispositif pour la transmission sans diaphonie", corresponding to the international application number PCT/EP2004/002383 of 18 Feb. 2004 (WO 2004/082168), entitled "Method and device for transmission without crosstalk".

The inventions described in these three patents may be implemented according to FIG. 1. The article of F. Broydé and E. Clavelier entitled "A New Method for the Reduction of Crosstalk and Echo in Multiconductor Interconnections", published in the journal *IEEE Transactions on Circuits and Systems I*, vol. 52, No. 2, pages 405 to 416, in Feb. 2005, corrected and supplemented by the article of F. Broydé and E. Clavelier entitled "Corrections to <<A New Method for the Reduction of Crosstalk and Echo in Multiconductor Interconnections>>", published in the journal *IEEE Transactions on Circuits and Systems I*, vol. 53, No. 8, p. 1851 in Aug. 2006, proves that the inventions described in said French patents number 0300064, number 0302814, number 0303087 and the corresponding international applications are indeed suitable for removing crosstalk between the different transmission channels obtained with said interconnection, and also for removing echo.

However, there are other crosstalk phenomena which may produce noise. Such phenomena are produced by some electromagnetic couplings between some conductors of said interconnection and other nearby conductors, for instance when said interconnection and these other conductors are built on the same printed circuit board. Such an "other nearby conductor" may for instance be a power supply conductor, a conductor of a link for digital signals, etc. We shall refer to these phenomena as "external crosstalk", for distinguishing them from crosstalk between said transmission channels, which shall be referred to as "internal crosstalk".

As explained in the prior art section of the French patent application number 07/05260 of 20 Jul. 2007 entitled "Procédé et dispositif pour les transmissions pseudo-différentielles", corresponding to the international application number PCT/IB2008/052102 of 29 May 2008 (WO 2009/013644), entitled "Method and device for pseudo-differential transmission", a transmission scheme using the reference conductor, which is often called the ground conductor, as a return path for the return current produced by the currents flowing in the transmission conductors, often suffers from a strong coupling between said transmission channels and other loops comprising a path in the reference conductor. This particular case of external crosstalk is sometimes called "ground noise" or "ground bounce".

If the interconnection is used for building m single-ended links, the reference conductor (ground) is used for the return current produced by the currents flowing on the m transmission conductors, as in the case shown in FIG. 1. This scheme is consequently vulnerable to external crosstalk (it is also subject to internal crosstalk). If the single-ended links are used for sending signals which contain frequencies for which the propagation phenomena in the interconnection are not negligible (for instance frequencies higher than the lowest propagation velocity in the interconnection divided by typically 15 times the length of the interconnection), it becomes necessary to use one or more termination circuit (4), as shown in FIG. 1, to reduce reflections. Such a termination circuit (4) may for instance correspond to the schematic diagram shown in FIG. 2, in the case of m=4 single-ended links. The termination circuit (4) shown in FIG. 2 comprises m signal terminals (101), a reference terminal (ground) and m resistors (401) (402) (403) (404), each of said resistors being connected between ground and one and only one of said signal terminals (101). Each signal terminal (101) is intended to be connected to a transmission conductor of the interconnection, and the termination circuit (4) shown in FIG. 2 is characterized, for the interconnection, by an impedance matrix with respect to ground, said impedance matrix with respect to ground being a diagonal matrix of size m×m.

Let us note that the ground symbol used in FIG. 2 (and also in the FIGS. 3, 13 and 14 discussed later) has exactly the same meaning as the other ground symbol used in some of the other accompanying drawings (the FIGS. 1, 9, 10, 11 and 12).

Section III of said paper entitled "A New Method for the Reduction of Crosstalk and Echo in Multiconductor Interconnections" explains that a termination circuit (4) such as the one shown in FIG. 2 cannot be matched, unless the transmission conductors are far apart and are hence uncoupled. It also explains that the detrimental effects of reflections may be minimized, if the values of the resistors (401) (402) (403) (404) shown in FIG. 2 are pseudo-matched impedances minimizing a matrix norm of the matrix $P_G$ of the voltage reflection coefficients, with respect to the reference conductor, of the termination circuit (4). This provides a reduction of echo and, to a limited extent, a reduction of internal crosstalk. Unfortunately, the termination circuit (4) shown in FIG. 2 produces return currents flowing mainly in the reference conductor, a characteristic which conflicts with the reduction of external crosstalk.

If the interconnection is used according to one of the inventions described in said French patents number 0300064, number 0302814 and number 0303087 and the corresponding international applications, the reference conductor (ground) is also used for the return current produced by the currents flowing on the m transmission conductors, as shown in FIG. 1. These inventions, which are suitable for reducing or eliminating internal crosstalk, are therefore prone to external crosstalk. A termination circuit (4) used in these inventions must be matched to the (m+1)-conductor multiconductor transmission line used to model the interconnection. That is to say: the impedance matrix, with respect to ground, of the termination circuit must approximate the characteristic impedance matrix $Z_{GC}$, with respect to ground, of said (m+1)-conductor multiconductor transmission line ($Z_{GC}$ is a matrix of size m×m). Such a termination circuit (4) may for instance correspond to the schematic diagram shown in FIG. 3. The termination circuit (4) shown in FIG. 3 comprises m signal terminals (101), a reference terminal (ground), m grounded resistors (401) (402) (403) (404) used as in FIG. 2 and non-grounded resistors (4012) (4013) (4014) (4023) (4024) (4034), each of the non-grounded resistors being connected between two signal terminals. Each signal terminal (101) is intended to be connected to a transmission conductor of the interconnection. The termination circuit (4) shown in FIG. 3 is characterized, for the interconnection, by an impedance matrix with respect to ground, said impedance matrix with respect to ground being a non-diagonal matrix of size m×m. The grounded resistors and the non-grounded resistors are proportioned such that the impedance matrix with respect to ground of the termination circuit (4) approximates said characteristic impedance matrix with respect to ground. Said paper entitled "A New Method for the Reduction of Crosstalk and Echo in Multiconductor Interconnections" shows that such a termination can be used to obtain a cancellation of echo and internal crosstalk. Unfortunately, the termination circuit (4) shown in FIG. 3 produces return currents flowing mainly in the reference conductor, a characteristic which conflicts with the reduction of external crosstalk.

However, there are transmission methods intended to provide a good protection against external crosstalk: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Carusone, K. Farzan and D. A. Johns entitled "Differential signaling with a reduced number of signal paths" published in *IEEE Transactions on Circuits and Systems II*, vol. 48, No. 3, pp. 294-300 in Mar. 2001 and the section 4.2.3 of the book of F. Yuan entitled *CMOS current-mode circuits for data communications*, published by Springer in 2007).

A differential device for transmission providing m transmission channels uses an interconnection having n=2m transmission conductors. A pseudo-differential device for transmission providing m transmission channels uses an interconnection having n=m transmission conductors and a common conductor distinct from the reference conductor (ground). The common conductor is referred to as "return conductor" in the case of the pseudo-differential transmission scheme disclosed in said French patent application number 07/05260 and the corresponding international application.

The French patent application number 07/04421 of 21 Jun. 2007, entitled "Dispositif d'interface pseudo-différentiel avec circuit de terminaison", corresponding to the international application number PCT/IB2008/051826 of 8 May 2008 (WO 2008/155676), entitled "Pseudo-differential interfacing device having a termination circuit", describes termination circuits which do not produce return currents flowing mainly in the reference conductor or in a power supply conductor. Such termination circuits may be used in the pseudo-differential transmission scheme disclosed in said French patent application number 07/05260 and the corresponding international application.

The FIG. 4 shows a first example of a termination circuit (4) described in said French patent application number 07/04421 and the corresponding international application, comprising m signal terminals (101), a common terminal (100) and m resistors (405) (406) (407) (408), each of said resistors being connected between the common terminal (100) and one and only one of said signal terminals (101). Each signal terminal (101) is intended to be connected to a transmission conductor of the interconnection and the common terminal (100) is intended to be connected to the return conductor of the interconnection.

The cell (42) shown in FIG. 5 consists of a n-channel transistor (425) and of a p-channel transistor (426) having their sources connected the one to the other and their drains connected the one to the other. This cell (42) has 4 terminals: a drain terminal (421), a source terminal (422), a terminal (423) for a "first control signal" and a terminal (424) for a "second control signal". This cell may be represented with the symbol (42) shown in FIG. 6, in which only the drain terminal (421) and the source terminal (422) are visible, the two other terminals being implicit. For small signals, such a cell may be considered as a resistor, this resistor being adjustable by electrical means, using the "first control signal" and/or the "second control signal". The FIG. 7 shows a second example of a termination circuit (4) described in said French patent application number 07/04421 and the corresponding international application, this example being identical to the one shown in FIG. 4, except that, in FIG. 7, m cells (405) (406) (407) (408) defined above are used in the place of the resistors (405) (406) (407) (408) used in FIG. 4.

The method of said French patent application number 07/05260 and the corresponding international application is very effective for the suppression of external crosstalk. However, it does not eliminate internal crosstalk. For instance, the article of F. Broydé and E. Clavelier entitled "A new pseudo-differential transmission scheme for on-chip and on-board interconnections" published in the proceedings of the "14$^{ème}$ colloque international sur la compatibilité électromagnétique—CEM 08", which took place in Paris, France, in May 2008, shows that internal crosstalk may be present when this method is used.

Conversely, as explained above, the inventions described in said French patents number 0300064, number 0302814 and number 0303087 and the corresponding international applications are suitable for removing internal crosstalk and echo, but they do not reduce external crosstalk.

DESCRIPTION OF THE INVENTION

It is an object of the interfacing device of the invention to provide transmission through an interconnection having two or more transmission conductors, the transmission presenting reduced external crosstalk and reduced internal crosstalk.

The invention is about a device for transmitting signals through a plurality of transmission channels, in a known frequency band, comprising:
m signal terminals, a common terminal and a reference terminal (ground), the signal terminals being intended to be connected to an interconnection having m transmission conductors, m being an integer greater than or equal to 2;
a receiving circuit delivering, when the receiving circuit is in the activated state, p "output signals of the receiving circuit" corresponding each to a transmission channel, p being an integer greater than or equal to 2 and less than or equal to m, the input of the receiving circuit being coupled to at least p of said signal terminals and to said common terminal, each of said "output signals of the receiving circuit" being mainly determined by one or more of the voltages between one of said signal terminals and said common terminal; and
a termination circuit coupled to each of said signal terminals and to said common terminal, the termination circuit being, when the termination circuit is in the activated state, approximately equivalent, for said signal terminals and said common terminal, to a (m+1)-terminal network such that, at at least one quiescent operating point, for small signals in a part of said known frequency band, the impedance matrix, with respect to said common terminal, of said (m+1)-terminal network is equal to a wanted non-diagonal matrix of size m×m.

In the receiving circuit of a device of the invention, the common terminal is distinct from the reference terminal, because the common terminal is used by the receiving circuit as a voltage-mode input, in such a way that each of said "output signals of the receiving circuit" is substantially only determined by one of more of the voltages between one of said signal terminals and the common terminal. Consequently, the common terminal is not connected to the reference terminal inside the receiving circuit of a device of the invention, and the voltage between the common terminal and the reference terminal has little or no influence on said "output signals of the receiving circuit". However, this does not preclude a use of a device of the invention wherein the common terminal of the device of the invention is grounded (i.e. connected to the reference terminal) outside the device of the invention, as explained below in the first embodiment and in the second embodiment.

In the following, the wordings "is in the deactivated state" and "is not in the activated state" are equivalent. According to the invention, said receiving circuit delivers "output signals of the receiving circuit" corresponding each to a transmission channel, when the receiving circuit is in the activated state. According to the invention, it is possible that there is a deactivated state of the receiving circuit, in which the behavior of the receiving circuit is different. However, the existence of a deactivated state of the receiving circuit is not at all a characteristic of the invention.

According to the invention, the "output signals of the receiving circuit" may be analog signals or digital signals.

According to the invention, each of said "output signals of the receiving circuit" is mainly determined by one or more of the voltages between one of said signal terminals and said common terminal. This must be interpreted in a broad sense, as: each of said "output signals of the receiving circuit" is mainly determined, at each point in time, by the history, up to said point in time, of one or more of the voltages between one of said signal terminals and said common terminal.

Consequently, a linear combination of elements $x_1, \ldots, x_r$ being a sum $\lambda_1 x_1 + \ldots + \lambda_r x_r$ where $\lambda_1, \ldots, \lambda_r$ are the coefficients of the linear combination, the specialist understands that, according to the invention, each of said "output signals of the receiving circuit" may be mainly determined by a linear combination of "filtered voltages between one of said signal terminals and said common terminal", each of said "filtered voltages between one of said signal terminals and said common terminal" being the result of the application of linear filtering to one of the voltages between one of said signal terminals and said common terminal.

Each of said "filtered voltages between one of said signal terminals and said common terminal" may be substantially equal to the corresponding voltage between one of said signal terminals and said common terminal. Consequently, according to the invention, each of said "output signals of the receiving circuit" may be mainly determined by a linear combination of the voltages between one of said signal terminals and said common terminal.

It is possible that each of said linear combinations is such that only one of the coefficients of said each of said linear combinations is not equal to zero. In this case, the specialist understands that the receiving circuit used in a device of the invention may be one of the prior art receiving circuit for pseudo-differential transmission, for instance one of the receiving circuits for receiving analog and/or digital signals mentioned in said French patent application number 07/04421 and the corresponding international application.

It is also possible that at least one of said linear combinations is such that two or more of the coefficients of said at least one of said linear combinations are not equal to zero. In this case, the specialist understands that the receiving circuit used in a device of the invention, capable of delivering p "output signals of the receiving circuit" as from p or more of the voltages between one of said signal terminals and said common terminal, may be a receiving circuit disclosed in the French patent application number 08/03830 of 7 Jul. 2008, entitled "Circuit de réception pseudo-différentiel", corresponding to the international application number PCT/IB2009/051053 of 13 Mar. 2009, entitled "Pseudo-differential receiving circuit". Such a receiving circuit may use analog signal processing and/or digital signal processing to produce said linear combinations. This type of receiving circuit may be such that one or more of said coefficients of said linear combinations can be adjusted by electrical means. We note that this type of receiving circuit relies on analog signal processing to perform the voltage differences needed to obtain that said "output signals of the receiving circuit" are mainly determined by the voltages between one of said signal terminals and said common terminal.

However, it is also conceivable that said receiving circuit used in a device of the invention relies on digital signal processing to perform the voltage differences needed to obtain that said "output signals of the receiving circuit" are mainly determined by the voltages between one of said signal terminals and said common terminal. For instance, the receiving circuit used in a device of the invention, producing p "output signals of the receiving circuit" as from p or more of the voltages between one of said signal terminals and said common terminal, may be a multiple-input device using digital signal processing having p+1 or more analog inputs, one of said analog inputs being coupled to the common terminal.

The termination circuit used in a device of the invention is, when the termination circuit is in the activated state, approximately equivalent, for said signal terminals and said common terminal, to a (m+1)-terminal network, that is to say a network having a number of terminals equal to m+1. Said (m+1)-terminal network is such that, at at least one quiescent operating point, for small signals in a part of said known frequency band, the impedance matrix, with respect to said common terminal, of said (m+1)-terminal network is equal to a wanted non-diagonal matrix of size m×m. This is in contrast with the prior art termination circuits shown in FIG. 4 and FIG. 7, which are intended to provide, for said signal terminals and said common terminal, an impedance matrix, with respect to said common terminal, equal to a diagonal matrix of size m×m. We note that, consequently, a device of the invention cannot be used in any prior art pseudo-differential transmission scheme. The components of said wanted non-diagonal matrix of size m×m may be frequency-dependent complex numbers, in said part of said known frequency band. However, the components of said wanted non-diagonal matrix of size m×m may also be real numbers and/or frequency-independent numbers.

The above-defined condition on the impedance matrix, with respect to said common terminal, of said (m+1)-terminal network used to model the termination circuit should be applicable to the normal operation of the device of the invention. Said quiescent operating point chosen for determining the impedance matrix, with respect to said common terminal, of said (m+1)-terminal network should therefore be such that the quiescent voltages between each of said signal terminals and said common terminal have values which may appear at a given point in time under normal operation.

According to the invention, the termination circuit in the activated state may be such that each diagonal component of said wanted non-diagonal matrix of size m×m has, in said part of said known frequency band, an absolute value less than or equal to thousand ohms and a real part greater than or equal to three ohms and greater than or equal to one tenth of said absolute value. Experience shows that the set of the dynamic impedances defined by these inequalities contains the impedance values capable of effectively reducing the reflections of signals propagating through typical interconnections.

According to the invention, the termination circuit in the activated state may be such that at least one of the non-diagonal components of said wanted non-diagonal matrix of size m×m has, in said part of said known frequency band, an absolute value greater than or equal to 1% of the absolute value of one or more of the diagonal components of said wanted non-diagonal matrix of size m×m.

According to the invention, it is possible that there is a deactivated state of the termination circuit, in which the behavior of the termination circuit is different from the one defined above. However, the existence of a deactivated state of the termination circuit is not at all a characteristic of the invention. The characteristics specified for the activated state of the termination circuit are particularly relevant when the device of the invention receives signals coming from said interconnection. Consequently, a device of the invention may be such that said termination circuit is in the activated state when said receiving circuit is in the activated state.

A device of the invention may be such that said (m+1)-terminal network may be considered as linear. Consequently, according to the invention, said termination circuit in the activated state may, for said signal terminals and said common terminal, be approximately equivalent to a linear (m+1)-terminal network such that, in a part of said known frequency band, the impedance matrix, with respect to said common terminal, of said linear (m+1)-terminal network is equal to said wanted non-diagonal matrix of size m×m.

An interfacing device of the invention may be such that said termination circuit is made of a network of resistors, m of said resistors being connected between one of said signal terminals and said common terminal, one or more of said resistors being connected between two of said signal terminals.

A termination circuit made of a network of resistors is however not at all a characteristic of the invention. By way of a first example, designers may, in order to reduce the power consumed by the termination circuit, choose to allow the termination circuit to be effective only in a relevant interval of frequencies, for instance by including suitable reactive circuit elements in the termination circuit. By way of a second example, the termination circuit could include active components, for instance insulated gate field-effect transistors (MOSFETs) operating in the ohmic regime. The impedance of the channel of such components may be adjustable by electrical means. Consequently, said termination circuit may be such that the impedance matrix, with respect to said common terminal, of said termination circuit in the activated state can be adjusted by electrical means.

In the case where the termination circuit has an activated state and a deactivated state, the impedance of the channel of one or more MOSFETs may for instance be controlled by one or more control signals taking on different values in the activated state and in the deactivated state. Consequently, said termination circuit may be such that said termination circuit has an activated state and a deactivated state, the impedance matrix, with respect to said common terminal, of said termination circuit in the activated state being different from the impedance matrix, with respect to said common terminal, of said termination circuit in the deactivated state.

In the case where the termination circuit has an activated state and a deactivated state, components such as transistors may for instance be used as switches having a closed state and an open state. In this case, said transistors may for instance be in the closed state when the termination circuit is in the activated state, and be in the open state when the termination circuit is in the deactivated state. Consequently, said termination circuit may be such that said termination circuit has an activated state and a deactivated state, each current flowing from said termination circuit to one of said signal terminals being substantially zero when said termination circuit is in the deactivated state.

A device of the invention may further comprise a transmitting circuit receiving q "input signals of the transmitting circuit" corresponding each to a transmission channel, q being an integer greater than or equal to 2 and less than or equal to m, the output of the transmitting circuit delivering, when the transmitting circuit is in the activated state, at least q transmission variables to said signal terminals, each transmission variable being mainly determined by one or more of said "input signals of the transmitting circuit". For instance, each transmission variable may be mainly determined by one and only one of said "input signals of the transmitting circuit" or by a linear combination of said "input signals of the transmitting circuit". For instance, said transmitting circuit could be similar to one of the transmitting circuits described in said French patents number 0300064, number 0302814 and number 0303087 and the corresponding international applications.

According to the invention, each transmission variable delivered by the transmitting circuit is determined by one or more of said "input signals of the transmitting circuit", when the transmitting circuit is in the activated state. According to the invention, it is possible that there is a deactivated state of the transmitting circuit, in which the behavior of the transmitting circuit is different. However, the existence of a deactivated state of the transmitting circuit is not at all a characteristic of the invention.

An interfacing device of the invention may be such that said termination circuit has no part in common with said receiving circuit and/or, if the device of the invention comprises a transmitting circuit, with said transmitting circuit. Conversely, an interfacing device of the invention may be such that said termination circuit has one or more parts in common with said receiving circuit and/or with said transmitting circuit.

Said interconnection having at least m transmission conductors may be realized using a cable. Said interconnection may also be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

A device of the invention may be such that it constitutes a part of an integrated circuit, said interconnection being realized inside said integrated circuit. In this case, it is possible that said m signal terminals and/or said common terminal are not coupled to pins of said integrated circuit.

A device of the invention may be such that it constitutes a part of an integrated circuit, each of said m signal terminals being coupled to one or more pins of said integrated circuit, said common terminal being coupled to one or more pins of said integrated circuit. This configuration is appropriate when said interconnection is realized outside said integrated circuit. The specialist notes that if there are many signal terminals, for instance more than 16 signal terminals, the absolute value of the current which may flow through the common terminal may become much larger than the maximum absolute value of the current flowing through a single signal terminal. Consequently, in this case, if a single pin is allocated to the common terminal, a degradation of transmission may occur for fast signals, because of the inductance of a connection using a single pin. In this case, using several pins for the common terminal reduces this inductance and improves transmission.

The number m of signal terminals may be equal to the number p of "output signals of the receiving circuit".

If the device of the invention comprises said transmitting circuit, the number m of signal terminals may be equal to the number q of "input signals of the transmitting circuit". In particular, m may be greater than or equal to three.

According to the invention, the p "output signals of the receiving circuit" may for instance be delivered using p single-ended links. According to the invention, the p "output signals of the receiving circuit" may for instance be delivered using p differential links. According to the invention, the q "input signals of the transmitting circuit" may for instance be applied to the transmitting circuit using q single-ended links. According to the invention, the q "input signals of the transmitting circuit" may for instance be applied to the transmitting circuit using q differential links.

According to the invention, said termination circuit is coupled to each of said signal terminals and to said common terminal, and the termination circuit in the activated state is, for said signal terminals and said common terminal, approximately equivalent to a (m+1)-terminal network. These characteristics imply that the termination circuit in the activated state behaves, for said signal terminals and said common terminal, as if it was not connected to said reference terminal. Consequently, said (m+1)-terminal network does not have an impedance matrix with respect to said reference terminal.

However, a device of the invention may further comprise a damping circuit coupled to said common terminal, the damping circuit being, for said common terminal, approximately equivalent to a 2-terminal network consisting of a passive two-terminal circuit element connected in series with a voltage source delivering a constant voltage, said 2-terminal network having a first terminal connected to said common terminal, said 2-terminal network having a second terminal connected to said reference terminal (ground).

A device of the invention comprising a damping circuit may be such that said passive two-terminal circuit element belonging to said 2-terminal network approximately equivalent to said damping circuit may be considered as linear. Consequently, according to the invention, said damping circuit may be, for said common terminal, approximately equivalent to a network consisting of a passive linear two-terminal circuit element having a first terminal coupled to said common terminal and a second terminal held at a (positive, negative or zero) fixed voltage with respect to said reference terminal. Such a damping circuit is characterized, at any non-zero frequency, by a scalar impedance. We observe that the combination of such a damping circuit and of said termination circuit in the activated state is approximately equivalent, for said signal terminals and said common terminal, to a (m+2)-terminal network, one of the terminals of said (m+2)-terminal network being grounded, said (m+2)-terminal network having, at at least one quiescent operating point, for small signals in a part of said known frequency band, an impedance matrix, with respect to said common terminal, which is a matrix of size (m+1)×(m+1), and an impedance matrix, with respect to the reference terminal, which is a matrix of size (m+1)×(m+1).

The specialist understands that a device of the invention may also comprise a damping circuit coupled to said common terminal, the damping circuit being, for said common terminal, approximately equivalent to a passive two-terminal circuit element connected in parallel with a current source delivering a constant current, said passive two-terminal circuit element having a first terminal connected to said common terminal, said passive two-terminal circuit element having a second terminal connected to said reference terminal (ground). Said constant current may be positive, negative or zero.

An interfacing device of the invention may be such that said damping circuit has no part in common with said receiving circuit and/or with said termination circuit and/or, if the device of the invention comprises a transmitting circuit, with said transmitting circuit. Conversely, an interfacing device of the invention may be such that said damping circuit has one or more parts in common with said receiving circuit and/or with said termination circuit and/or with said transmitting circuit.

Even in the case of a device of the invention in which said receiving circuit, said termination circuit, said damping circuit (if the device of the invention comprises a damping circuit) and said transmitting circuit (if the device of the invention comprises a transmitting circuit) are not without any part in common to any two of them, the specialist understands that the functions of the receiving circuit, of the termination circuit, of the damping circuit (if the device of the invention comprises a damping circuit) and of the transmitting circuit (if the device of the invention comprises a transmitting circuit) are distinct. The definition of a device of the invention, this definition being based on the presence of a receiving circuit, of a termination circuit, and possibly of a damping circuit and/or of a transmitting circuit, must therefore be understood as a definition relating to functions.

According to the invention, the receiving circuit and/or the transmitting circuit may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as the distortions caused by propagation. The reduction of these distortions may be obtained, in a device of the invention, using an equalization reducing the effects of the distortions caused by propagation, said equalization being implemented in said receiving circuit and/or in said transmitting circuit. This type of processing, which is also sometimes referred to as compensation, is well known to specialists, and may be implemented using analog signal processing and/or digital signal processing. Specialists know that it is commonplace to use adaptive algorithms for implementing this type of processing in receivers for data transmission. A device of the invention may use an adaptive equalization. This type of processing is well known to specialists, and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment

Best Mode

Figure 8:
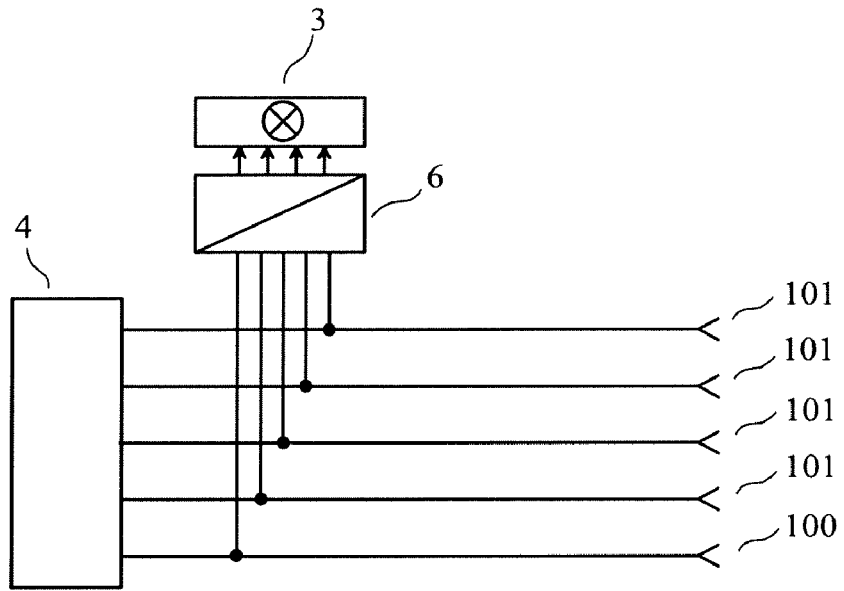
FIG. 8 shows a first embodiment of the invention.

As a first embodiment of an interfacing device of the invention, given by way of non-limiting example and best mode of carrying out the invention, we have represented in FIG. 8 an interfacing device of the invention built inside an integrated circuit, comprising m=4 signal terminals (101) and a common terminal (100), the signal terminals (101) and the common terminal (100) being intended to be connected to an interconnection having m=4 transmission conductors. The signal terminals (101) are numbered from 1 to m.

A receiving circuit (6) delivers, when the receiving circuit is in the activated state, p=4 "output signals of the receiving circuit" corresponding each to a transmission channel, the input of the receiving circuit being coupled to the 4 signal terminals (101) and to the common terminal (100), each of said "output signals of the receiving circuit" being determined by a linear combination of the voltages between one of said signal terminals (101) and said common terminal (100). More precisely, if we use $v_{C\ j}$, to denote the voltage between the signal terminal number j and the common terminal, each of said "output signals of the receiving circuit" is, at each point in time, solely determined by the history, up to this point in time, of a linear combination of the voltages $v_{C\ 1}, \ldots, v_{C\ m}$. The receiving circuit (6) comprises no connection between said common terminal and the reference terminal. The "output signals of the receiving circuit" are delivered to the destination (3). When the receiving circuit (6) is not in the activated state, its output presents a high impedance, so that the receiving circuit (6) does not deliver any of the "output signals of the receiving circuit". The specialists know several methods suitable for producing a high impedance state at the output of the receiving circuit (6). We note that the circuits needed to control the activated state of the receiving circuit (6) at a given point in time are not shown in FIG. 8.

Figure 9:
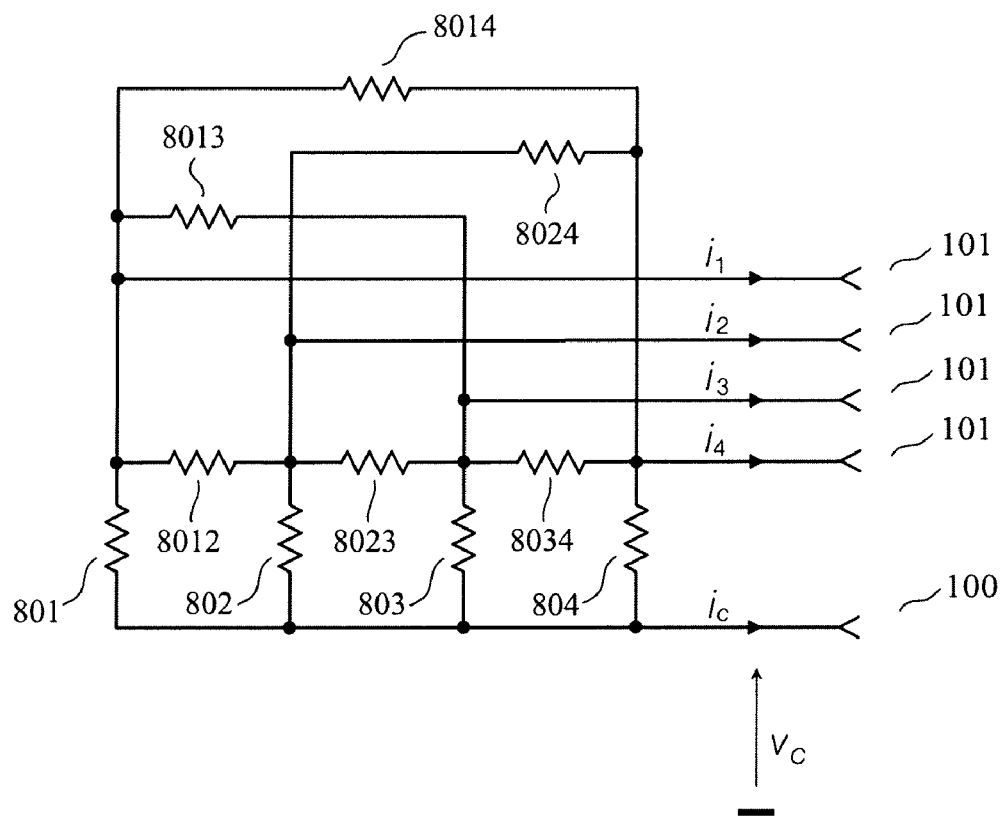
FIG. 9 shows an equivalent network for the signal terminals and the common terminal in the first embodiment.

A termination circuit (4) is coupled to each of said signal terminals (101) and to said common terminal (100). When the receiving circuit (6) is in the activated state, the termination circuit (4) is in the activated state and is, for said signal terminals (101) and said common terminal (100), approximately equivalent to the (m+1)-terminal network shown in FIG. 9, at a quiescent operating point, for small signals in a part of the known frequency band used for transmission. This (m+1)-terminal network consists of m=4 resistors (801) (802) (803) (804) connected between one of said signal terminals (101) and said common terminal (100) and of m(m−1)/2=6 other resistors (8012) (8013) (8014) (8023) (8024) (8034), each of said other resistors being connected between two of said signal terminals (101). The equivalent network shown in FIG. 9 is characterized, for the interconnection, by an impedance matrix $Z_{CT}$ with respect to the common terminal, $Z_{CT}$ being a non-diagonal matrix of size m×m. The specialist understands how the resistors shown in FIG. 9 may be proportioned such that $Z_{CT}$ approximates a wanted non-diagonal real matrix of size m×m.

The m+1 terminals of the (m+1)-terminal network shown in FIG. 9 being the signal terminals (101) and the common terminal (100), the (m+1)-terminal network is only connected to the signal terminals (101) and the common terminal (100). Consequently, the termination circuit (4) behaves like a floating termination circuit.

An interconnection coupled to the signal terminals (101) and to the common terminal (100) sees a circuit element having m+2=6 terminals if we include the reference terminal (ground). The input of the receiving circuit (6) always presents a high impedance in said part of said known frequency band, so that, when the receiving circuit (6) is in the activated state, the currents through the signal terminals (101) and the common terminal (100) are mainly determined by the termination circuit (4). Consequently, the FIG. 9 also corresponds to an equivalent network of the circuit element having m+2 terminals seen by the interconnection when the receiving circuit (6) is in the activated state, in an ideal implementation, at a quiescent operating point, for small signals in said part of said known frequency band. The specialists understand that such an equivalent network is only suitable for determining the voltages between these m+2 terminals and the currents flowing out of these terminals. We note that this equivalent network does not comprise any connection to the reference terminal (ground). Consequently, the equivalent network shown in FIG. 9 does not have an impedance matrix with respect to said reference terminal and the small-signal current $i_C$ flowing out of said common terminal (100) is equal to the opposite of the sum of the small-signal currents $i_1, \ldots, i_m$ flowing out of said signal terminals (101), that is to say $$i_C \approx -\sum_{a=1}^{m} i_a \qquad (1)$$

The small-signal voltage $v_C$ between said common terminal (100) and ground has therefore no effect on $i_C$. The specialist understands that, in a real implementation, it is possible that this equality is not exactly satisfied.

The specialist understands how he may, using prior art techniques, design a termination circuit (4) and a receiving circuit (6) meeting the characteristics specified for this first embodiment.

Figure 10:
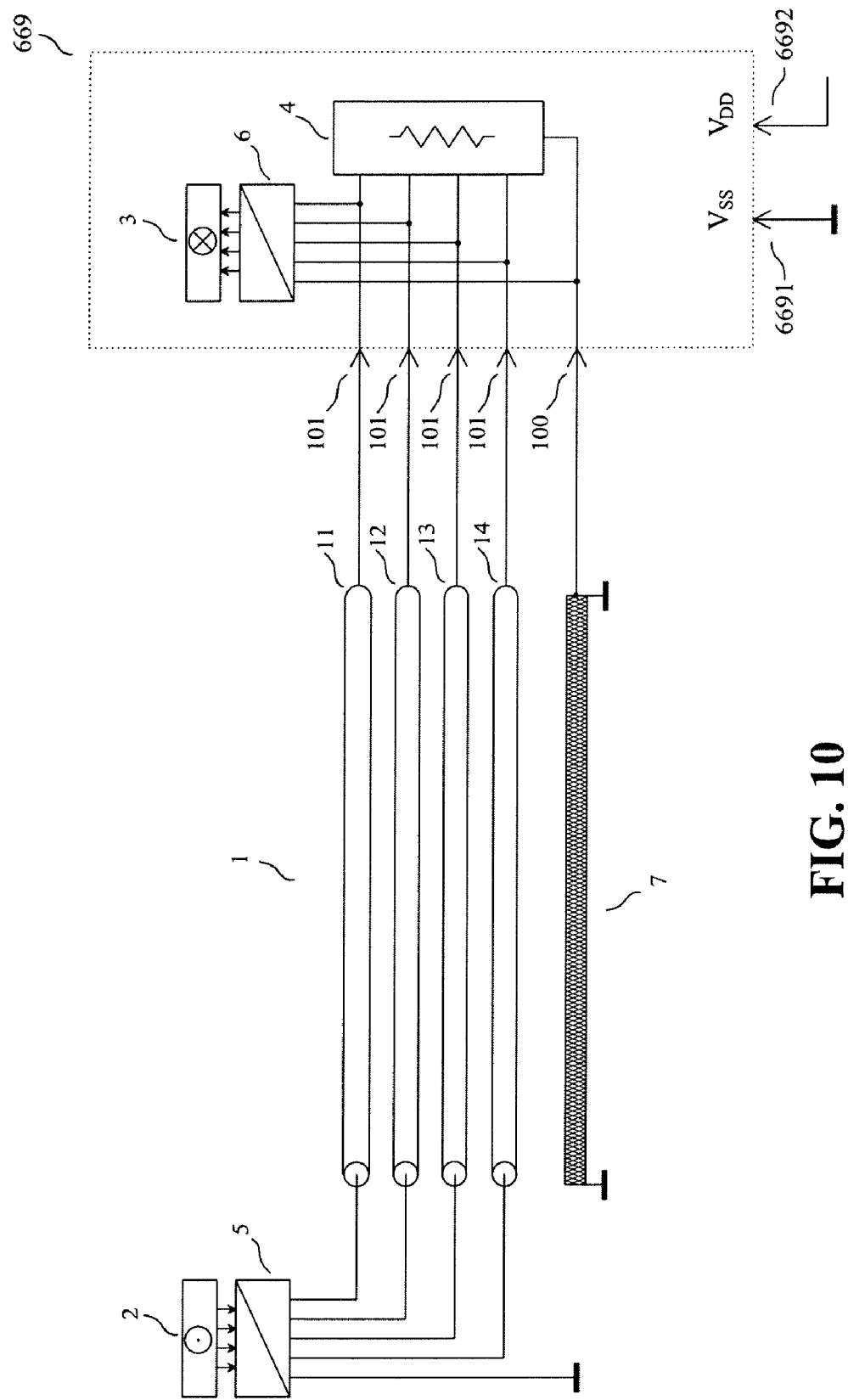
FIG. 10 shows a use of the first embodiment.

FIG. 10 shows a use of a device of the first embodiment of the invention, this use comprising an interconnection (1) having m=4 transmission conductors (11) (12) (13) (14) and a reference conductor (7), that is to say a ground conductor. All items shown in FIG. 10 belong to the same printed circuit assembly and the reference conductor (7) is a ground plane of the printed circuit board of this printed circuit assembly. Said transmission conductors (11) (12) (13) (14) are traces built in the printed circuit board. In FIG. 10, the transmitting circuit (5) receives at its input the signals of the 4 channels of the source (2), and its 5 output terminals are connected to the conductors of the interconnection (1), one of these conductors being ground. As said above, the interfacing device of the invention comprising the receiving circuit (6) and the termination circuit (4) is built inside an integrated circuit (669) which also comprises the destination (3). The integrated circuit (669) is power supplied via one or more pins (6691) connected to said ground plane and one or more pins (6692) connected to a power plane of the printed circuit board. The common terminal node of the receiving circuit (6) and the termination circuit (4) are not grounded inside said integrated circuit (669). Thus, the common terminal (100) of the device of the invention is not grounded inside the device of the invention. The signal terminals (101) of the device of the invention are connected to the transmission conductors (11) (12) (13) (14) of the interconnection (1) and the common terminal (100) of the device of the invention is connected to said reference conductor (7). Thus, the common terminal (100) of the device of the invention is grounded outside the device of the invention. The use shown in FIG. 10 provides 4 transmission channels, the signals of the 4 channels of the source (2) being sent to the 4 channels of the destination (3).

In FIG. 10, the transmitting circuit (5) and the termination circuit (4) are designed as explained in said French patent number 0300064, the corresponding international application and said article entitled "A New Method for the Reduction of Crosstalk and Echo in Multiconductor Interconnections", except that the termination circuit (4) is not directly connected to the reference conductor (7). The receiving circuit (6) combines the natural voltages present on the transmission conductors (11) (12) (13) (14) according to linear combinations defined by the inverse of the transition matrix from modal electrical variables to natural electrical variables used in the transmitting circuit (5), each of said "output signals of the receiving circuit" being mainly determined by one and only one of the modal electrical variables appearing at the input of said receiving circuit (6). Since the common terminal (100) of the device of the invention is connected to said reference conductor (7), the specialist understands that the receiving circuit (6) indeed senses the natural voltages present on the transmission conductors (11) (12) (13) (14), that is to say the voltages between each of the transmission conductors (11) (12) (13) (14) and the reference conductor (7). Consequently, each of said "output signals of the receiving circuit" may be accurately determined by one and only one of the modal electrical variables appearing at the input of said receiving circuit (6).

If the invention described in said French patent number 0300064, the corresponding international application and said article entitled "A New Method for the Reduction of Crosstalk and Echo in Multiconductor Interconnections" had been directly used, each of said "output signals of the receiving circuit" would have been mainly determined by a linear combination of the voltages between one of said signal terminals (101) and the internal ground conductors of the integrated circuit (669), these ground conductors being connected to said one or more pins (6691) connected to said ground plane. Consequently, the operation of the receiving circuit (6) would have been disturbed by external crosstalk, since the variable power supply currents flowing in said one or more pins (6691) connected to said ground plane would have induced noise voltages at the input of the receiving circuit (6). Consequently, each of said "output signals of the receiving circuit" could not have been accurately determined by one and only one of the modal electrical variables appearing at the input of said receiving circuit (6). The specialist understands that the device of the invention provides a protection against this cause of external crosstalk, because no variable power supply current flows in the connection between the common terminal (100) and the reference conductor (7). Thus, the use shown in FIG. 10 provides reduced external crosstalk, in addition to the reduction of internal crosstalk and echo inherent to the invention described in said French patent number 0300064 and the corresponding international application.

Second Embodiment

Figure 11:
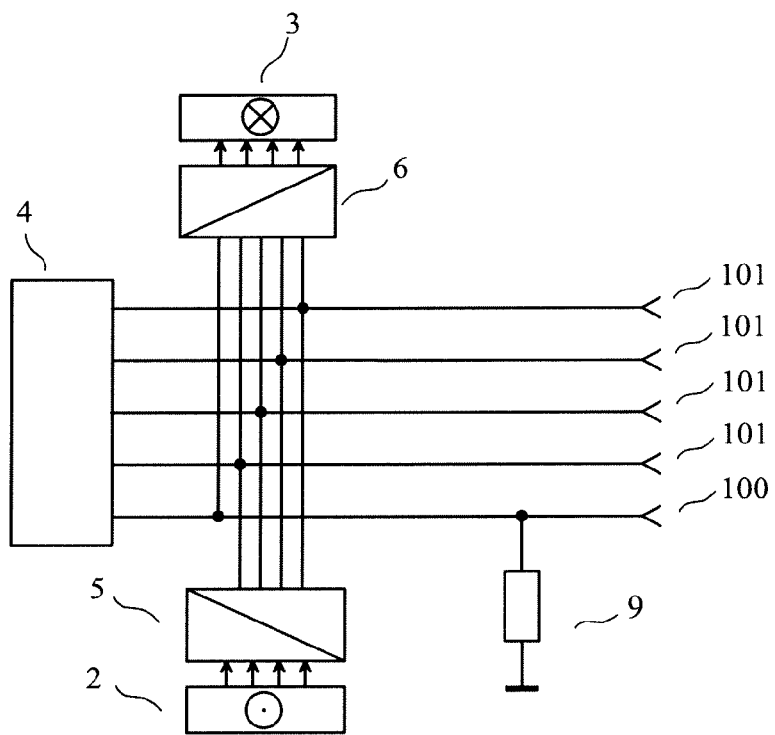
FIG. 11 shows a second embodiment of the invention.

As a second embodiment of an interfacing device of the invention, given by way of non-limiting example, we have represented in FIG. 11 an interfacing device of the invention comprising m=4 signal terminals (101) and a common terminal (100), the signal terminals (101) and the common terminal (100) being intended to be connected to an interconnection having m=4 transmission conductors.

A transmitting circuit (5) receives q=4 "input signals of the transmitting circuit" coming from a source (2), the output of the transmitting circuit being coupled to the 4 signal terminals (101). The output of the transmitting circuit (5) delivers, when the transmitting circuit is in the activated state, q=4 transmission variables, each transmission variable being a current flowing out of one of said signal terminals (101), each transmission variable being mainly determined by a linear combination of said "input signals of the transmitting circuit". When the transmitting circuit (5) is not in the activated state, its output presents a high impedance, so that the transmitting circuit (5) does not produce transmission variables and only causes a negligible current through the signal terminals (101).

A receiving circuit (6) identical to the one of the first embodiment delivers, when it is in the activated state, "output signals of the receiving circuit" to the destination (3).

The specialists know several methods suitable for producing a high impedance state at the output of the transmitting circuit (5) and at the output of the receiving circuit (6). The possibility of controlling the activated state of a transmitting circuit and/or of a receiving circuit is usually used in data bus architectures. We note that the circuits needed to control the activated state of the transmitting circuit (5) and of the receiving circuit (6) at a given point in time are not shown in FIG. 11. We also note that the address and/or control lines necessary for coordinating the activated state of the transmitting circuit (5) and of the receiving circuit (6) with the operation of the other entities connected to such a bus are not shown in FIG. 11.

A termination circuit (4) is coupled to each of said signal terminals (101) and to the common terminal (100). When the transmitting circuit (5) is not in the activated state, the termination circuit (4) is in the activated state. A damping circuit (9) is connected to said common terminal (100). The termination circuit (4) in the activated state and the damping circuit (9) are, for said signal terminals (101) and said common terminal (100), approximately equivalent, at a quiescent operating point, for small signals in a part of the known frequency band used for transmission, to the (m+2)-terminal network shown in FIG. 12, this (m+2)-terminal network consisting of:

a (m+1)-terminal network consisting of m=4 passive linear two-terminal circuit elements (801) (802) (803) (804) connected between one of said signal terminals (101) and said common terminal (100) and of m(m−1)/2=6 other passive linear two-terminal circuit elements (8012) (8013) (8014) (8023) (8024) (8034), each of said other passive linear two-terminal circuit elements being connected between two of said signal terminals (101);

one passive linear two-terminal circuit element (81) corresponding to the damping circuit (9), this passive linear two-terminal circuit element being connected between said common terminal (100) and said reference terminal.

When the transmitting circuit (5) is not in the activated state, the termination circuit (4) is in the activated state, so that, at a quiescent operating point, for small signals in said part of said known frequency band:

the termination circuit (4) has an impedance matrix $Z_{CT}$ with respect to said common terminal, $Z_{CT}$ being a non-diagonal matrix of size m×m;

the termination circuit (4) does not have an impedance matrix with respect to said reference terminal;

the combination of the damping circuit (9) and the termination circuit (4) has an impedance matrix $Z_{CL}$ with respect to said common terminal, $Z_{CL}$ being a non-diagonal matrix of size (m+1)×(m+1);

the combination of the damping circuit (9) and the termination circuit (4) has an impedance matrix $Z_{GL}$ with respect to said reference terminal, $Z_{GL}$ being a non-diagonal matrix of size (m+1)×(m+1).

The matrices $Z_{CT}$, $Z_{CL}$ and $Z_{GL}$ may be frequency dependent.

Figure 12:
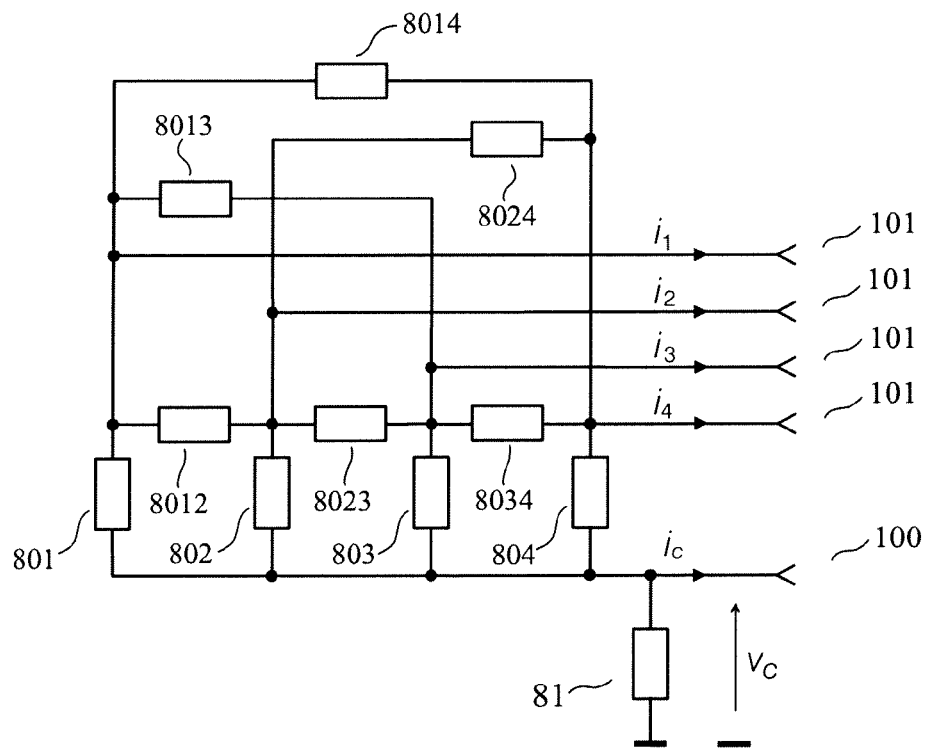
FIG. 12 shows an equivalent network for the signal terminals and the common terminal in the second embodiment.

An interconnection coupled to the signal terminals (101) and to the common terminal (100) sees a circuit element having m+2=6 terminals if we include the reference terminal (ground). The input of the receiving circuit (6) always presenting a high impedance in said part of said known frequency band, the currents through the signal terminals (101) and the common terminal (100) are mainly determined by the termination circuit (4) and the damping circuit (9), when the transmitting circuit (5) is not in the activated state. Consequently, the FIG. 12 also corresponds to an equivalent network of the circuit element having m+2 terminals seen by the interconnection when the transmitting circuit (5) is not in the activated state, in an ideal implementation, at a quiescent operating point, for small signals in said part of said known frequency band. In FIG. 12, the small-signal current $i_C$ flowing out of said common terminal (100) is, at a given frequency f, given by $$i_C \approx -\sum_{\alpha=1}^{m} i_\alpha - \frac{v_C}{Z_D} \quad (2)$$

where the previous notations have been used and where $Z_D$ is the impedance, at the frequency f, of the passive linear two-terminal circuit element (81) corresponding to the damping circuit (9). The specialist understands that, in a real implementation, it is possible that this equality is not exactly satisfied.

A use of the device of the second embodiment of the invention comprises an interconnection having m=4 transmission conductors and a reference conductor. In this use, the transmitting circuit (5), the source (2), the receiving circuit (6), the destination (3) and the damping circuit (9) shown in FIG. 11 are built inside a single integrated circuit, while the termination circuit (4) is built in a different component. Said integrated circuit, said component and said interconnection belong to the same printed circuit assembly and the reference conductor is a ground plane of the printed circuit board of this printed circuit assembly. Said transmission conductors are traces built in the printed circuit board. The signal terminals (101) of the device of the invention are connected to the transmission conductors of the interconnection and the common terminal (100) of the device of the invention is connected to said reference conductor. In order to obtain the best high-frequency performances, the pin(s) of said component corresponding to the node of the termination circuit (4) connected to the common terminal (100) is(are) directly connected to said ground plane. For the same reason, the pin(s) of said integrated circuit corresponding to the node of the receiving circuit (6) and of the damping circuit (9) connected to the common terminal (100) is(are) directly connected to the ground plane. Considering that the part of the ground plane where these connections are made is a part of the common terminal (100) of the device of the invention, we may consider that the common terminal (100) of the device of the invention is grounded outside the device of the invention. However, it would also have been possible to consider that the common terminal (100) of the device of the invention is grounded inside the device of the invention, but outside the receiving circuit (6). The specialist understands that the device of the invention provides a protection against the external crosstalk related to variable power supply currents caused by said integrated circuit.

Third Embodiment

Figure 13:
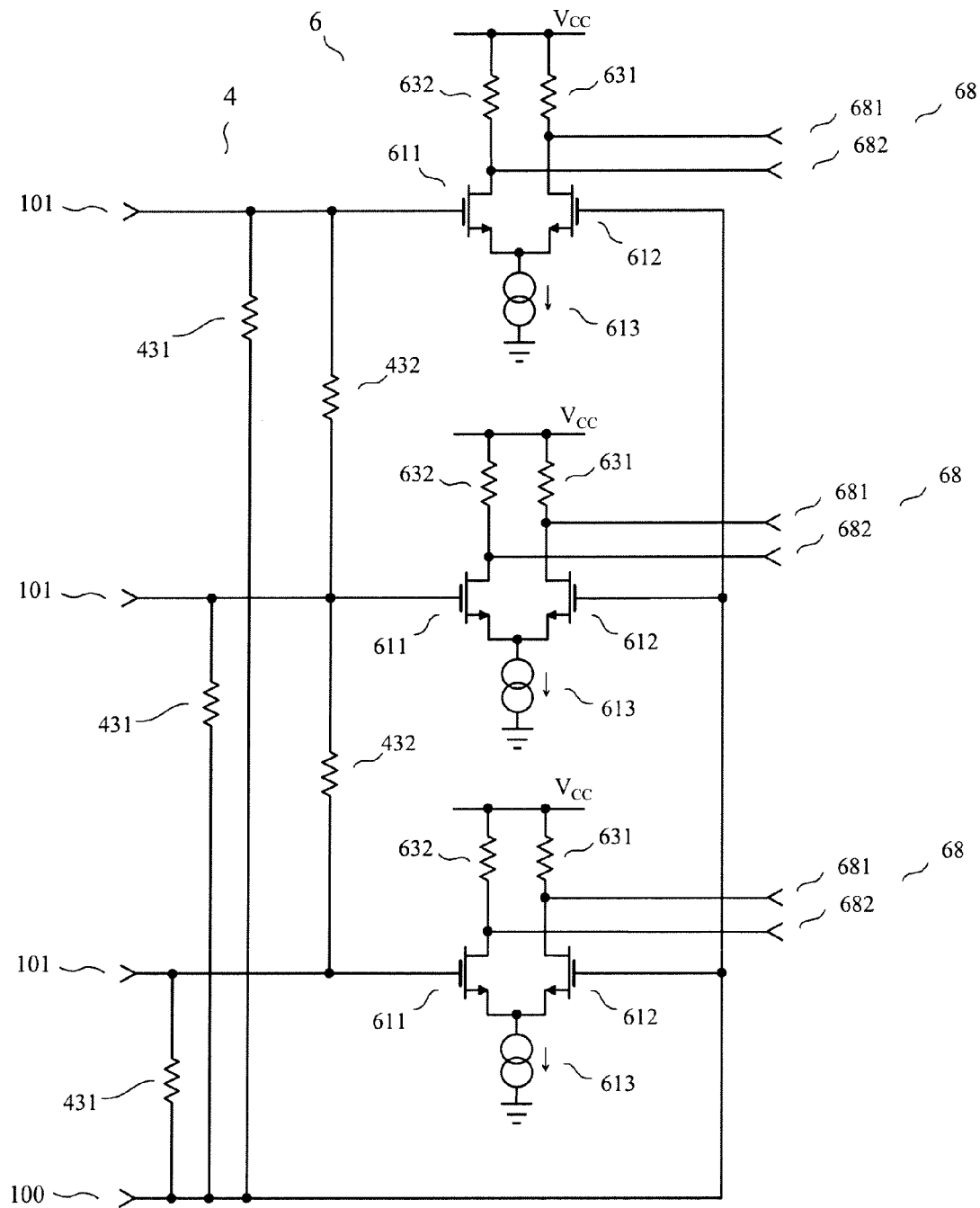
FIG. 13 shows a third embodiment.

The third embodiment of an interfacing device of the invention, given by way of non-limiting example, is shown in FIG. 13. The receiving circuit (6) and the termination circuit (4) shown in FIG. 13 are such that:

each of the p=3 "output signals of the receiving circuit" is delivered to an output (68) which is a differential output comprising 2 terminals (681) (682);

each of the p outputs (68) corresponds to the output of a differential pair made of two transistors (611) (612) whose sources are biased by a current source (613) and whose drains are biased by two resistors (631) (632);

each of the m=3 signal terminals (101) is connected to the gate of the first transistor (611) of one of said differential pairs;

the common terminal (100) is connected to the gates of the p second transistors (612) of said differential pairs;

the termination circuit (4) is made of m resistors (431) connected between one of said signal terminals (101) and said common terminal (100) and of m−1 other resistors (432), each of said other resistors being connected between two of said signal terminals (101);

the receiving circuit (6) consists of all components shown in FIG. 13, except the 2m−1 resistors (431) (432) of the termination circuit (4).

The specialist understands that the current sources (613) shown in FIG. 13 are ideal circuit elements which may be realized with real components, for instance using current mirrors. Let us note that one of the terminals of each of the current sources (613) is grounded. The specialist sees that the receiving circuit (6) shown in FIG. 13 produces at its outputs p "output signals of the receiving circuit" corresponding each to one of the transmission channels, each of the "output signals of the receiving circuit" being determined by a linear combination of the voltages between one of said signal terminals (101) and said common terminal (100), each of said linear combinations being such that only one of the coefficients of said each of said linear combinations is not equal to zero. In other words, each of said "output signals of the receiving circuit" is determined by one and only one of the voltages between one of said signal terminals (101) and said common terminal (100).

In FIG. 13, if we neglect the gate currents of the transistors (611) (612) of the differential pairs, only the resistors (431) (432) of the termination circuit (4) produce currents through the signal terminals (101) and through the common terminal (100). We note that, in this third embodiment, the termination circuit (4) is equivalent, for said signal terminals (101) and said common terminal (100), to a (m+1)-terminal network such that the impedance matrix, with respect to said common terminal, of said (m+1)-terminal network is equal to a wanted non-diagonal matrix of size m×m. We also note that, in this third embodiment, the termination circuit (4) is always in the activated state.

This third embodiment is appropriate for receiving analog or digital signals.

Fourth Embodiment

Figure 1:
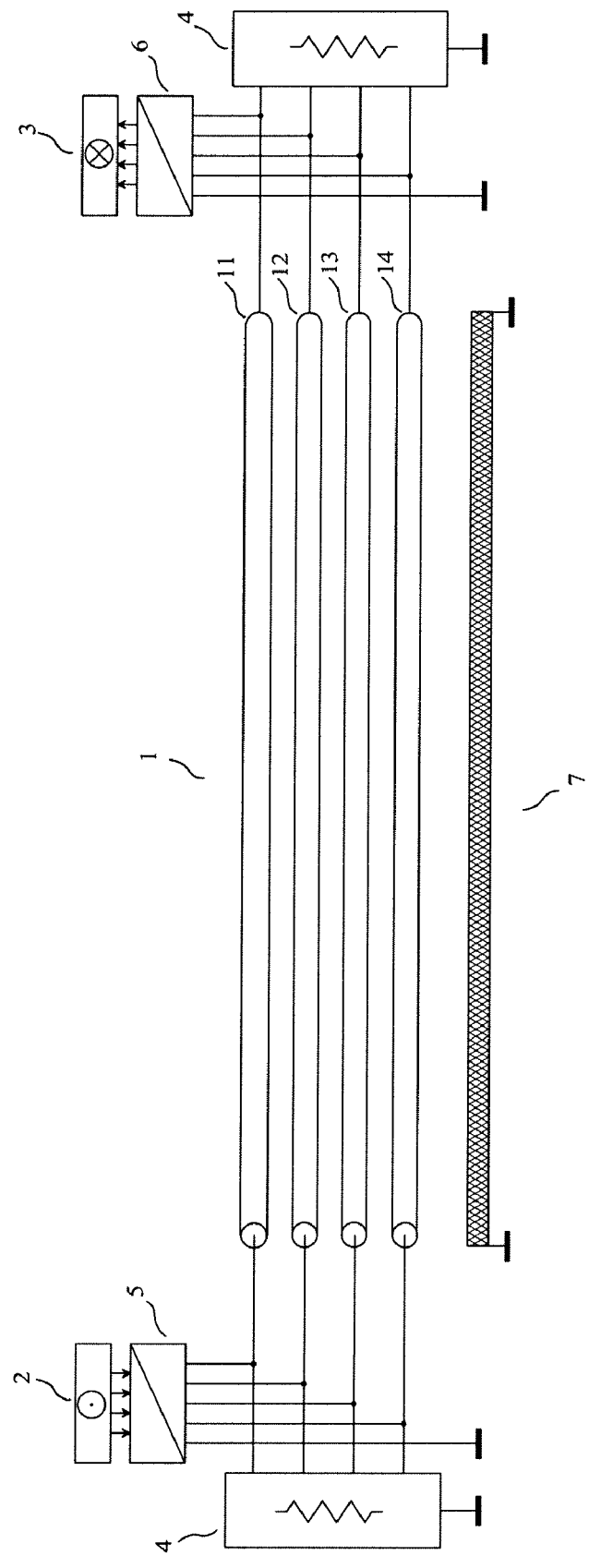
FIG. 1 shows a system for transmission comprising an interconnection having four transmission conductors, and has already been discussed in the section dedicated to the presentation of prior art.
Figure 2:
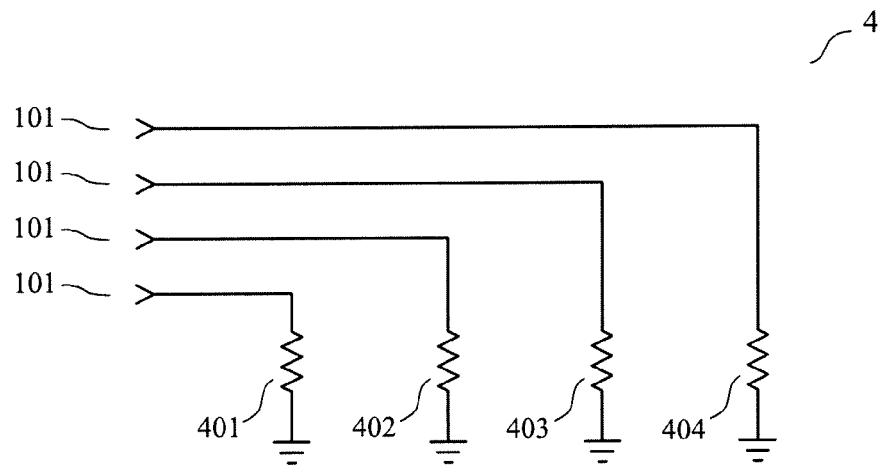
FIG. 2 shows a first termination which may be used in the system for transmission shown in FIG. 1, and has already been discussed in the section dedicated to the presentation of prior art.
Figure 3:
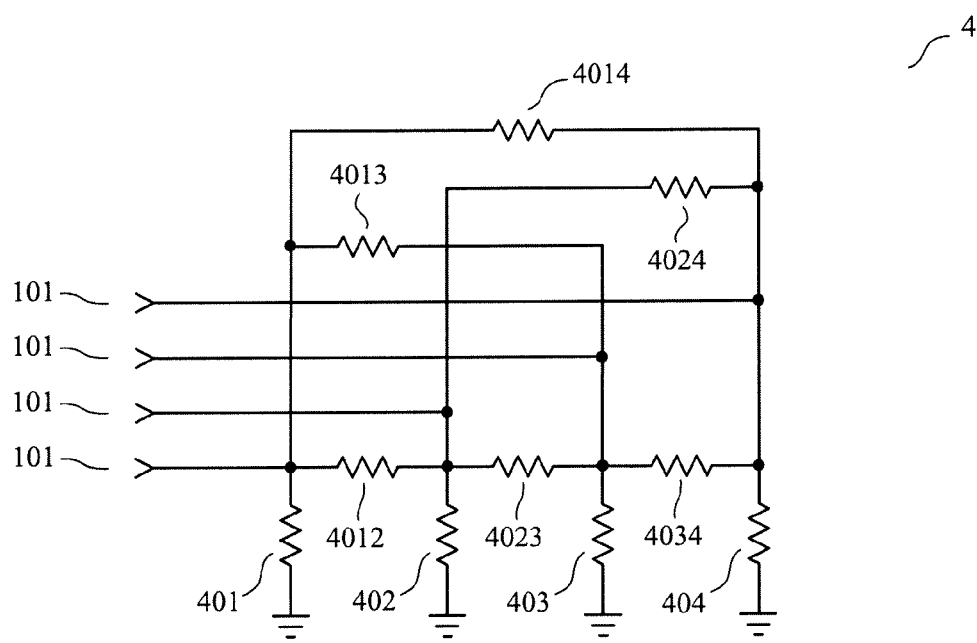
FIG. 3 shows a second termination which may be used in the system for transmission shown in FIG. 1, and has already been discussed in the section dedicated to the presentation of prior art.
Figure 4:
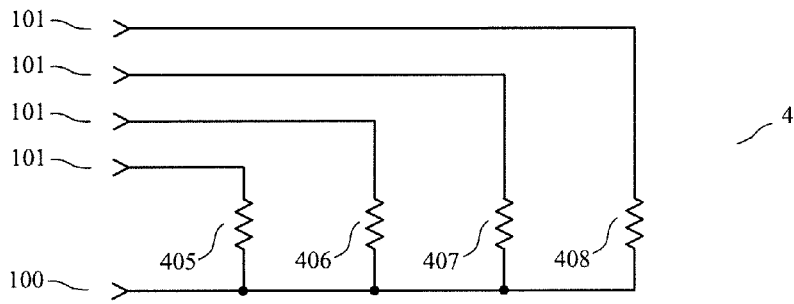
FIG. 4 shows a first termination circuit which may be used in a pseudo-differential transmission scheme, and has already been discussed in the section dedicated to the presentation of prior art.
Figure 5:
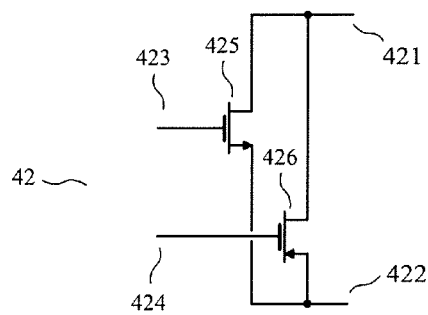
FIG. 5 shows a cell of the termination circuit shown in FIG. 7, and has already been discussed in the section dedicated to the presentation of prior art.
Figure 6:
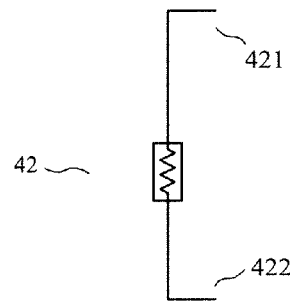
FIG. 6 shows a symbol for the cell of FIG. 5, and has already been discussed in the section dedicated to the presentation of prior art.
Figure 7:
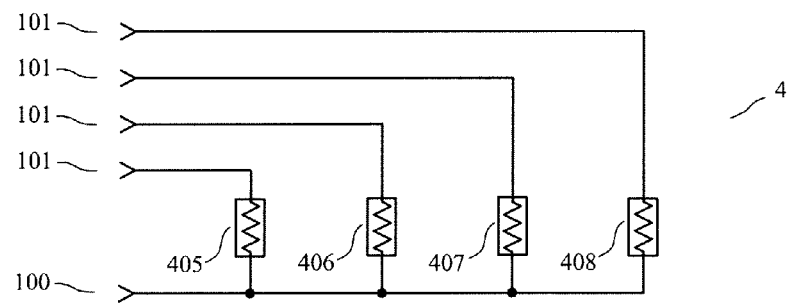
FIG. 7 shows a second termination circuit which may be used in a pseudo-differential transmission scheme, and has already been discussed in the section dedicated to the presentation of prior art.
Figure 14:
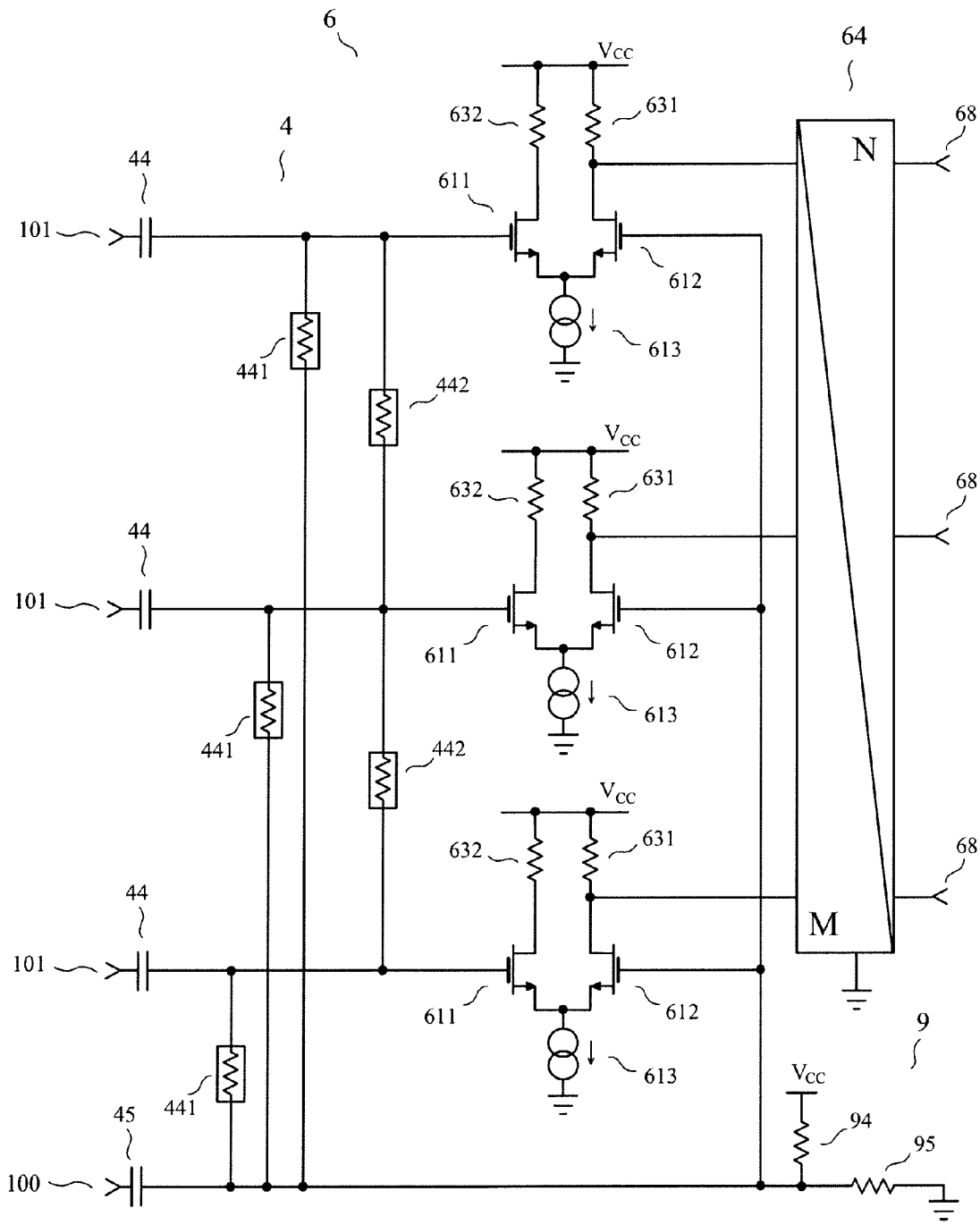
FIG. 14 shows a fourth embodiment and a fifth embodiment.

The fourth embodiment of an interfacing device of the invention, given by way of non-limiting example, comprises the receiving circuit (6), the termination circuit (4) and the damping circuit (9) shown in FIG. 14, in which:

each of the p=3 "output signals of the receiving circuit" is delivered to an output (68) which is a single-ended output;

each of the p outputs (68) corresponds to an output of a combining circuit (64) having m inputs and p outputs;

each input of said combining circuit (64) corresponds to an output of a differential pair made of two transistors (611) (612) whose sources are biased by a current source (613) and whose drains are biased by two resistors (631) (632);

each of the m=3 signal terminals (101) is connected to the first terminal of a capacitor (44) whose second terminal is connected to the gate of the first transistor (611) of one of said differential pairs;

the common terminal (100) is connected to the first terminal of a capacitor (45) whose second terminal is connected to the gates of the p second transistors (612) of said differential pairs;

the termination circuit (4) is made of said capacitors (44) (45) and of 2m+1 cells (441) (442) defined above in the discussion of the FIG. 5 and FIG. 6, m of said cells (441) being each connected between the gates of the transistors (611) (612) of one of said differential pairs and m−1 of said cells (442) being each connected between the gates of the first transistors (611) of two of said differential pairs;

the damping circuit (9) is made of a resistor (94) connected between a node at a power supply voltage and the gates of the p second transistors (612) of said differential pairs, and of a resistor (95) connected between the reference terminal (ground) and the gates of the p second transistors (612) of said differential pairs;

the receiving circuit (6) consists of all components shown in FIG. 14, except the components already identified as belonging to the termination circuit (4) or to the damping circuit (9).

Said combining circuit (64) is a multiple-input and multiple-output amplifier having m inputs and p outputs, each output voltage of said multiple-input and multiple-output amplifier being a linear combination of its input voltages such that two or more of the coefficients of said linear combination are not equal to zero. The specialist sees that the receiving circuit (6) is one of the receiving circuits described in said French patent application number 08/03830 and the corresponding international application.

The receiving circuit (6) is not directly connected to said signal terminals (101) and to said common terminal (100). However, the receiving circuit (6) is coupled to the p signal terminals (101) through capacitors (44) and to said common terminal (100) through a capacitor (45), in such a way that the receiving circuit (6) produces at its outputs p "output signals of the receiving circuit" corresponding each to one of the transmission channels, each of the "output signals of the receiving circuit" being determined by a linear combination of the voltages between one of said signal terminals (101) and said common terminal (100), such that two or more of the coefficients of said linear combination are not equal to zero.

The damping circuit (9) is not directly connected to said common terminal (100). However, the damping circuit (9) is coupled to said common terminal (100) through a capacitor (45), in such a way that the damping circuit (9) is, for said common terminal (100), approximately equivalent to a 2-terminal network consisting of a passive two-terminal circuit element connected in series with a voltage source delivering a constant voltage, said 2-terminal network having a first terminal connected to said common terminal (100), said 2-terminal network having a second terminal connected to said reference terminal (ground). Another function of the damping circuit (9) is to provide a suitable biasing to the gate of said transistors (611) (612).

In the above definition of the termination circuit (4), of the damping circuit (9) and of the receiving circuit (6), the capacitors (44) (45) providing an alternating current coupling are defined as being only a part of the termination circuit (4). Consequently, the termination circuit (4), the damping circuit (9) and the receiving circuit (6) are without any part in common to any two of them. However, it is clear that the capacitors (44) connected to said signal terminals (101) are necessary to the operation of the receiving circuit (6) and that the capacitor (45) connected to said common terminal (100) is necessary to the operation of the receiving circuit (6) and of the damping circuit (9). Consequently, it would be possible to consider that the capacitors (44) connected to said signal terminals (101) belong to the receiving circuit (6) and/or that the capacitor (45) connected to said common terminal (100) belongs to the receiving circuit (6) or to the damping circuit (9). It would also be possible to consider that the termination circuit (4), the damping circuit (9) and the receiving circuit (6) are not without any part in common to any two of them.

When the "first control signal of the termination circuit" applied to the cells (441) (442) is low and the "second control signal of the termination circuit" applied to the cells (441) (442) is high, the termination circuit (4) is considered as in the deactivated state.

When the "first control signal of the termination circuit" applied to the cells (441) (442) is high and the "second control signal of the termination circuit" applied to the cells (441) (442) is low, the termination circuit (4) is considered as in the activated state and the termination circuit (4) is, for said signal terminals (101) and said common terminal (100), approximately equivalent to a (m+1)-terminal network such that, at a specified quiescent operating point, for small signals in a part of said known frequency band, the impedance matrix, with respect to said common terminal, of said (m+1)-terminal network is equal to a wanted non-diagonal matrix of size m×m, this wanted non-diagonal matrix of size m×m being adjustable by electrical means, using the "first control signal of the termination circuit" and/or the "second control signal of the termination circuit".

This fourth embodiment also comprises a transmitting circuit, which is not shown in FIG. 14. The fourth embodiment is appropriate for sending and receiving analog or digital signals without intended direct current component.

Fifth Embodiment

The fifth embodiment of an interfacing device of the invention, given by way of non-limiting example, also corresponds to the receiving circuit, the termination circuit and the damping circuit shown in FIG. 14.

The fifth embodiment is identical to the fourth embodiment except that, in the fifth embodiment, the combining circuit (64) is a multiple-input device using digital signal processing having p analog inputs, instead of the multiple-input and multiple-output amplifier used in the fourth embodiment. Each output signal of said multiple-input device using digital signal processing is determined by a linear combination of its input voltages such that two or more of the coefficients of said linear combination are not equal to zero. The specialist sees that the receiving circuit (6) is one of the receiving circuits described in said French patent application number 08/03830 and the corresponding international application.

This receiving circuit (6) is such that each of said "output signals of the receiving circuit" is a digital signal available at one of the outputs (68). Alternatively, each of said "output signals of the receiving circuit" could be delivered by a parallel interface using several output terminals. Alternatively, all said "output signals of the receiving circuit" could share the same serial or parallel interface, each of said "output signals of the receiving circuit" corresponding to a logical transmission channel created on this interface.

INDICATIONS ON INDUSTRIAL APPLICATIONS

The interfacing device of the invention is suitable for transmission between integrated circuits through an interconnection having two or more transmission conductors, the transmission presenting reduced unwanted couplings. An interfacing device of the invention can take the place of a receiving circuit and a termination circuit used in one of the devices described in said French patents number 0300064, number 0302814 and number 0303087 and the corresponding international applications, and thereby provide a reduction of external crosstalk. This is for instance explained in the discussion of the use shown in FIG. 10. However, we note that the interfacing device of the invention is not compatible with any known pseudo-differential transmission scheme, since neither prior art nor this application contain the description of a pseudo-differential transmission scheme which can use a termination circuit approximately equivalent to a (m+1)-terminal network such that the impedance matrix, with respect to said common terminal, of said (m+1)-terminal network is equal to a wanted non-diagonal matrix of size m×m. For instance, we note that the use shown in FIG. 10 does not correspond to a pseudo-differential transmission scheme in the meaning of said French patent application number 07/05260 and said corresponding international application, because it uses an interconnection which comprises neither a common conductor nor a return conductor distinct from the reference conductor.

Consequently, the interfacing device of the invention is very different from the invention described in said French patent application number 07/04421 and said corresponding international application, which is intended to be used in a pseudo-differential transmission scheme but which cannot take the place of a receiving circuit and a termination circuit used in one of the devices described in said French patents number 0300064, number 0302814 and number 0303087 and the corresponding international applications.

We note that, in the embodiments of an interfacing device of the invention, given above by way of non-limiting examples and shown in FIGS. 5, 13 and 14, the active components are MOSFETs. This is not at all a characteristic of the invention, and specialists understand that it would have also been possible to use bipolar transistors or other types of active components. Consequently, the interfacing device of the invention may be implemented in integrated circuits made using any applicable manufacturing process.

The invention is suitable for the protection against the noise produced by unwanted electromagnetic couplings in printed circuit boards. The invention is particularly beneficial to printed circuit boards comprising wide-band analog circuits or fast digital circuits.

The interfacing device of the invention is particularly suitable for transmission inside an integrated circuit, because it provides a good protection against the noise related to the currents flowing in the reference conductor and in the substrate of the integrated circuit.

An interfacing device of the invention may be built inside an integrated circuit, but this is not at all a characteristic of the invention. For instance, it may be interesting that the receiving circuit be built inside an integrated circuit, the termination circuit being built outside this integrated circuit.

The invention is suitable for an implementation in a data bus architecture.

The invention is particularly suitable for multilevel signaling, because this type of transmission scheme is more sensitive to noise than binary signaling.

The invention, in particular when the transmission variables used by said transmitting circuit are currents, is particularly suitable for simultaneous bi-directional signaling, because this type of transmission scheme is more sensitive to noise than unidirectional signaling.

The invention claimed is:

1. A device for transmitting signals through a plurality of transmission channels, in a known frequency band, comprising:

m signal terminals, a common terminal and a reference terminal, the signal terminals being intended to be connected to an interconnection having m transmission conductors, m being an integer greater than or equal to 2;

a receiving circuit delivering, when the receiving circuit is in the activated state, p output signals of the receiving circuit corresponding each to a transmission channel, p being an integer greater than or equal to 2 and less than or equal to m, the input of the receiving circuit being coupled to at least p of the signal terminals and to the common terminal, each of the output signals of the receiving circuit being mainly determined by one or more of the voltages between one of the signal terminals and the common terminal; and a termination circuit coupled to each of the signal terminals and to the common terminal, the termination circuit being, when the termination circuit is in the activated state, approximately equivalent, for the signal terminals and the common terminal, to a (m+1)-terminal network such that, at at least one quiescent operating point, for small signals in a part of the known frequency band, the impedance matrix, with respect to the common terminal, of said (m+1)-terminal network is equal to a wanted non-diagonal matrix of size m×m.

2. The device for transmitting signals of claim 1, wherein each of the output signals of the receiving circuit is mainly determined by a linear combination of the voltages between one of the signal terminals and the common terminal.

3. The device for transmitting signals of claim 1, wherein each of the output signals of the receiving circuit is determined by one and only one of the voltages between one of the signal terminals and the common terminal.

4. The device for transmitting signals of claim 1, wherein the termination circuit is in the activated state when the receiving circuit is in the activated state.

5. The device for transmitting signals of claim 1, wherein the impedance matrix, with respect to the common terminal, of the termination circuit in the activated state can be adjusted by electrical means.

6. The device for transmitting signals of claim 1, wherein the termination circuit has an activated state and a deactivated state, each current flowing from the termination circuit to one of the signal terminals being substantially zero when the termination circuit is in the deactivated state.

7. The device for transmitting signals of claim 1, further comprising a transmitting circuit receiving q input signals of the transmitting circuit corresponding each to a transmission channel, q being an integer greater than or equal to 2 and less than or equal to m, the output of the transmitting circuit delivering, when the transmitting circuit is in the activated state, at least q transmission variables to the signal terminals, each transmission variable being mainly determined by one or more of the input signals of the transmitting circuit.

8. The device for transmitting signals of claim 1, wherein said device for transmitting signals constitutes a part of an integrated circuit, the interconnection being realized inside the integrated circuit.

9. The device for transmitting signals of claim 1, wherein said device for transmitting signals constitutes a part of an integrated circuit, each of the signal terminals being coupled to one or more pins of the integrated circuit, the common terminal being coupled to one or more pins of the integrated circuit.

10. The device for transmitting signals of claim 1, further comprising a damping circuit coupled to the common terminal, the damping circuit being, for the common terminal, approximately equivalent to a 2-terminal network consisting of a passive two-terminal circuit element connected in series with a voltage source delivering a constant voltage, the 2-terminal network having a first terminal connected to the common terminal, the 2-terminal network having a second terminal connected to the reference terminal.

11. A use of the device for transmitting signals of claim 1, wherein the common terminal of the device for transmitting signals is grounded.

* * * * *